US009117332B2

(12) United States Patent
Chan

(10) Patent No.: US 9,117,332 B2
(45) **Date of Patent: *Aug. 25, 2015**

(54) JACKPOT AWARDS ON A GAMING MACHINE

(75) Inventor: Matthew James Chan, East Killara (AU)

(73) Assignee: Aristocrat Technologies Australia Pty Limited (AU)

( * ) Notice: Subject to any disclaimer, the term of this patent is extended or adjusted under 35 U.S.C. 154(b) by 281 days.

This patent is subject to a terminal disclaimer.

(21) Appl. No.: 13/540,248

(22) Filed: Jul. 2, 2012

(65) Prior Publication Data

US 2012/0329548 A1 Dec. 27, 2012

Related U.S. Application Data

(63) Continuation of application No. 12/471,882, filed on May 26, 2009, now Pat. No. 8,235,797.

(51) Int. Cl.

*G06F 17/00* (2006.01)
*G06F 19/00* (2011.01)
*G07F 17/32* (2006.01)
*G07F 17/34* (2006.01)

(52) U.S. Cl.

CPC ............ *G07F 17/32* (2013.01); *G07F 17/3258* (2013.01); *G07F 17/3267* (2013.01); *G07F 17/34* (2013.01)

(58) Field of Classification Search

USPC .................................................. 463/20, 22
See application file for complete search history.

(56) References Cited

U.S. PATENT DOCUMENTS

| | | | | |
|---|---|---|---|---|
| 4,448,419 | A * | 5/1984 | Telnaes | 463/21 |
| 5,169,147 | A * | 12/1992 | Hamano | 463/21 |
| 6,520,856 | B1 | 2/2003 | Walker et al. | |
| 8,235,797 | B2 * | 8/2012 | Chan | 463/20 |
| 8,251,794 | B2 * | 8/2012 | O'Halloran | 463/20 |
| 2004/0072613 | A1 | 4/2004 | Vixocnik | |
| 2007/0209823 | A1 | 9/2007 | Vexler et al. | |
| 2009/0291744 | A1 * | 11/2009 | Chan | 463/20 |

FOREIGN PATENT DOCUMENTS

| | | |
|---|---|---|
| AU | 2007209823 | 3/2008 |

* cited by examiner

*Primary Examiner* — Steven J Hylinski
(74) *Attorney, Agent, or Firm* — McAndrews, Held & Malloy, Ltd.

(57) ABSTRACT

A method for use with a gaming system that provides a game in which a plurality of symbols are selected and presented on a display to form one or more combinations includes: providing a base game, providing a feature game on the occurrence of a first event during play of the base game, awarding a jackpot on the occurrence of a second event during play of the feature game, and varying the probability of both the first and the second events dependent on at least an aspect of a wager placed by a player to play the base game, wherein said variation maintains at least an approximately constant probability of the jackpot being won despite variations in said aspect of the wager.

20 Claims, 4 Drawing Sheets

JACKPOT AWARDS ON A GAMING MACHINE

RELATED APPLICATIONS

This application is a continuation of U.S. patent application Ser. No. 12/471,882 having a filing date of May 26, 2009 now U.S. Pat. No. 8,235,797, which claims priority to Australian Provisional Patent Application No. 2008902606 having a filing date of May 26, 2008, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to gaming systems and methods of gaming. A particular embodiment of the present invention relates to the award of jackpot awards on a gaming machine where the size of the jackpot is independent of the wager placed on the gaming machine.

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming machines that are allowable, both in terms of the prevailing regulations and in terms of providing a return on investment to the gaming venue operators. Also, increasingly suppliers of gaming devices and systems are faced with the problem of the existence of patents in the relevant jurisdiction that cover particular devices, systems and methods of operation, which sometimes make it desirable to develop useful alternatives.

Gaming machines that offer jackpots have become popular at many gaming venues internationally. One form of jackpot that is often awarded is a progressive jackpot, which increases in value as a function of game play on the gaming machines linked to the progressive jackpot. Typically only gaming machines that contribute to the progressive jackpot can win the jackpot.

Unlike many other prizes, jackpot prizes like progressive jackpots are not normally multiplied by the wager placed by a player when the player won the prize. For example, a player who wagered 10 credits per line on a game will receive the same progressive jackpot prize as a player who wagered 1 credit per line. This creates a problem of the jackpot effectively giving players playing 1 credit per line having a higher return to player than players who wager more than 1 credit per line.

DEFINITIONS

For the purposes of this specification, the terms below have generally been used with reference to their associated definitions in this section.

Jackpot: means any award paid where the combined effect of the size of the award and the probability of winning an award is not constant or substantially constant across all wager options available in a game from which the jackpot may be won.

Combinations: means the one or more outcomes of a game played on a gaming machine or system. Combinations are often represented to the player as combinations of symbols on a display of a gaming machine or system.

Jackpot symbol: any symbol the occurrence of which forms a part of a combination that either directly results in the award of a jackpot or is one step in a multi-stage process to win a jackpot.

BRIEF SUMMARY OF THE INVENTION

According to a first aspect, the invention broadly resides in a gaming system that provides a game in which a plurality of symbols are selected from one or more symbol sets and presented on a display to form one or more combinations and if the combinations include a winning combination, the gaming system awards an award, the gaming system awarding a jackpot dependent on the occurrence of a jackpot winning event that includes the occurrence of one or more jackpot symbols, the gaming system including a user interface in communication with a game controller that allows the player to select a wager, wherein if all other variables of the game remained constant the wager is variable disproportionately to the probability of the jackpot being awarded, and wherein the size of at least one of the symbol sets from which the one or more jackpot symbols are selected is variable between game plays, dependent on said wager, so as to maintain at least an approximately constant probability of the jackpot being won despite variations in the wager. The disproportionate variability may depend on the entire wager or only an aspect of the wager.

According to a second aspect, the invention broadly resides in a gaming system that provides a game in which a plurality of symbols are selected from a plurality of symbol sets and presented on a display to form one or more combinations and if one or more of said combinations on which the player has staked a wager includes a winning combination, the gaming system awards an award, the gaming system awarding a jackpot dependent on the occurrence of a jackpot winning event that includes the occurrence of one or more jackpot symbols, the gaming system including a user interface in communication with a game controller that allows the player to select at least one of a first wager aspect and a second wager aspect, the first wager aspect being the number of said combinations on which to stake a wager and the second wager aspect being the amount to stake on the selected combinations, wherein the size of at least one of the symbol sets from which the one or more jackpot symbols are selected is variable between game plays, dependent on at least one of the first and second wager aspects, so as to maintain at least an approximately constant chance of the jackpot being won despite variations in the first and/or second wager aspects.

In one embodiment, the game is a spinning reel game so that the plurality of symbol sets are each in the form of a reel in the spinning reel game and at least one of the reels includes at least one jackpot symbol. The one or more combinations may include symbols along one or more pay lines defined across the spinning reels. A said jackpot winning event may be the occurrence of a certain number of jackpot symbols along a pay line on which the player has staked a wager. The number of symbols in at least one of the symbol sets from which the jackpot symbols are selected may be variable dependent on the amount staked by the player per pay line in that game play and not dependent on the number of pay lines on which a wager has been staked.

In one embodiment, the number of symbols in at least one of the symbol sets from which the jackpot symbols are selected is variable dependent on the product of the amount staked by the player per pay line in that game play and the number of pay lines on which a wager has been staked.

In one embodiment, the game includes a base game and a feature game which is played when a trigger condition occurs during play of the base game, and wherein the jackpot is won from the feature game. With particular reference to the second aspect, the jackpot symbols may occur in the feature game and the number of symbols in at least one of the symbol sets from which the jackpot symbols are selected is variable between game plays of the feature game, dependent on the first and/or second wager aspects of the wager made in the base game in which the trigger condition occurred.

The probability of occurrence of the trigger condition may be independent of both the first and second wager aspects of the wager made in the base game.

The probability of occurrence of the trigger condition may instead be dependent on the first wager aspect and independent of the second aspect, and wherein the number of symbols in at least one of the symbol sets from which the jackpot symbols are selected is variable between game plays of the feature game, dependent on the second wager aspect of the wager made in the base game in which the trigger condition occurred and independent of the first wager aspect of the wager made in the base game.

The probability of occurrence of the trigger condition may instead be dependent on the second wager aspect and independent of the first aspect, and wherein the number of symbols in at least one of the symbol sets from which the jackpot symbols are selected is variable between game plays of the feature game, dependent on the first wager aspect of the wager made in the base game in which the trigger condition occurred and independent of the second wager aspect of the wager made in the base game.

In one embodiment, the number of jackpot symbols in at least two symbol sets is variable between game plays, dependent on at least one of the first and second wager aspects.

According to a third aspect, the invention broadly resides in a method for use with a gaming system that provides a game in which a plurality of symbols are selected and presented on a display to form one or more combinations and if one or more of said combinations on which the player has staked a wager includes a winning combination, the gaming system awards an award, the method including:

awarding a jackpot dependent on the occurrence of a jackpot winning combination that includes one or more jackpot symbols during play of the game;

receiving a selection of at least one of a first wager aspect and a second wager aspect, the first wager aspect being the number of said combinations on which to stake a wager and the second wager aspect being the amount to stake on the selected combinations;

dependent on the received selection varying the number of symbols in at least one of the symbol sets from which the jackpot symbols are selected, so as to maintain at least an approximately constant chance of the jackpot being won despite variations in the first and/or second wager aspects.

In one embodiment, the method includes awarding the jackpot dependent on the occurrence of a said jackpot winning combination in a feature game, wherein the feature game is triggered from a base game playable on the gaming system.

According to a fourth aspect, the invention broadly resides in a gaming system that provides a game in which a plurality of symbols are selected from one or more symbol sets and presented on a display to form one or more combinations and if the combinations includes a winning combination, the gaming system awards an award, the gaming system awarding a jackpot dependent on the occurrence of a jackpot winning event that includes a first event in a base game of the game and a second event in a feature game of the game, both the first and the second events occurring according with a probability in their respective base and feature games determined according to a random process, the gaming system including a user interface in communication with a game controller that allows the player to select a wager, wherein at least one aspect of the wager is variable disproportionately to the probability of the jackpot being awarded if all other variables of the game remained constant, wherein the probability of both the first and the second event is varied, dependent on said aspect of the wager, so as to maintain at least an approximately constant probability of the jackpot being won despite variations in said aspect of the wager.

In one embodiment, at least one of the first and second events includes the selection of jackpot symbols from one or more symbol sets, wherein the number of members in the one or more symbol sets from which a jackpot symbol may be selected is varied to achieve said variation in the probability of the first and/or second event. The number of jackpot symbols may also be varied to achieve, in combination with the variation in the number of members in the symbol set, said variation in the probability of the first and/or second event.

According to a fifth aspect, the invention broadly resides in a method for use with a gaming system that provides a game in which a plurality of symbols are selected and presented on a display to form one or more combinations, the method including:

providing a base game;

providing a feature game on the occurrence of a first event during play of the base game;

awarding a jackpot on the occurrence of a second event during play of the feature game; and varying the probability of both the first and the second events dependent on at least an aspect of a wager placed by a player to play the base game, wherein said variation maintains at least an approximately constant probability of the jackpot being won despite variations in said aspect of the wager.

In one embodiment, occurrence of at least one of the first and second events is indicated by the display of a jackpot symbol or a combination of jackpot symbols and the probability of at least one of the first and second events is achieved by varying the number of symbols in a symbol set from which a jackpot symbol or jackpot symbols are selected for display.

Further aspects of the present invention and further embodiments of the aspects described in the preceding paragraphs will become apparent from the following description, given by way of example and with reference to the accompanying drawings.

DETAILED DESCRIPTION OF THE INVENTION

Figure 1:
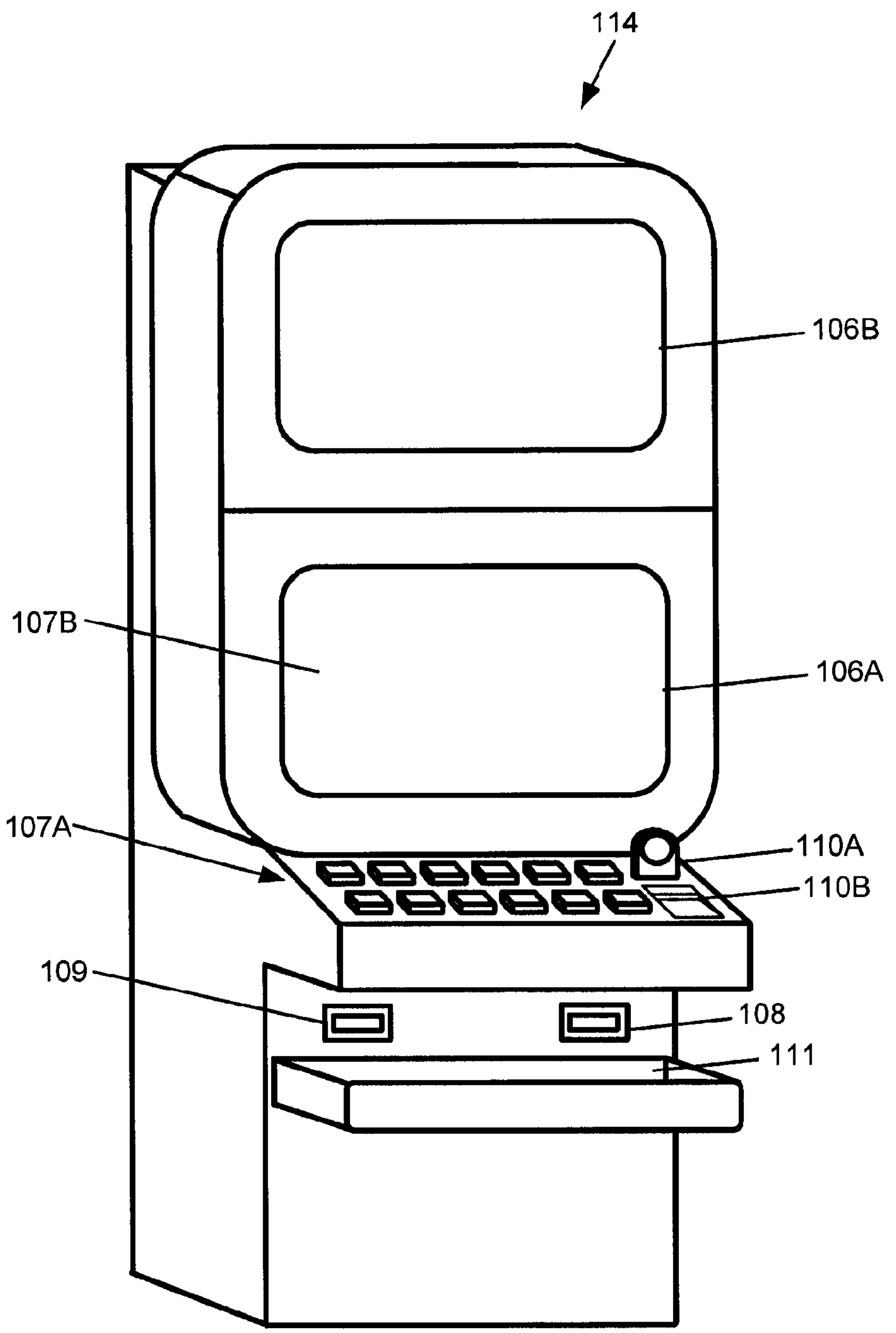
FIG. 1: shows diagrammatically, a view of a gaming console suitable for implementing the present invention.

In FIG. 1 of the accompanying drawings, one example of a gaming console that is suitable to implement the present invention is generally referenced by arrow 114.

The gaming console 114 includes two displays 106A, 106B on one or both of which is displayed representations of a game that can be played by a player and a bank of buttons 107A and/or a touch screen 107B to enable a player to play the game. The displays 106 may be video display units, such as a cathode ray tube screen device, a liquid crystal display, plasma screen, any other suitable video display unit, or the visible portion of an electromechanical device. The display 106B may display artwork, including for example, pay tables and details of bonus awards and other information or images relating to the game. In alternative gaming consoles the display 106B may be omitted, optionally replaced by a static display.

A credit input including a coin input 110A and/or bill collector 110B allows a player to provide credit for wagering and a coin output 111 is provided for cash payouts from the gaming console 114. A card and/or ticket reader 108 and a printer 109 may be provided to provide player tracking, cashless game play or other gaming and non-gaming related functions.

Figure 2:
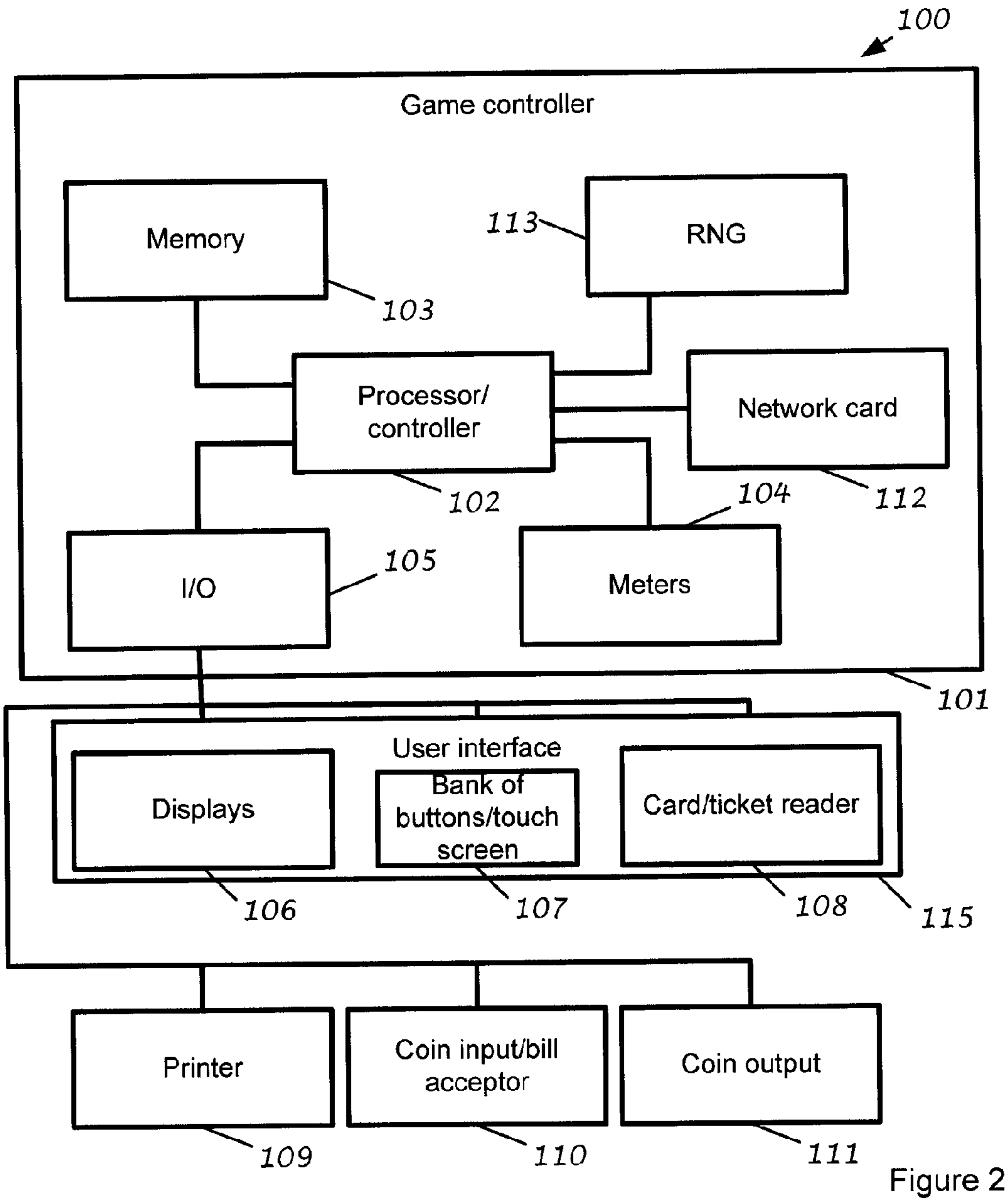
FIG. 2: shows a block diagram of gaming system suitable for implementing the present invention.

FIG. 2 shows a block diagram of a gaming system, generally referenced by arrow 100, suitable for implementing the present invention, which may be in the form of a gaming machine. The gaming machine 100 may include the gaming console 114 shown in FIG. 1 and accordingly like reference numerals have been used to describe like components in FIGS. 1 and 2.

The gaming machine 100 includes a game controller 101, which in the illustrated example includes a computational device 102, which may be a microprocessor, microcontroller, programmable logic device or other suitable device. Instructions and data to control operation of the computational device 102 are stored in a memory 103, which is in data communication with, or forms part of, the computational device 102. Typically, the gaming machine 100 will include both volatile and non-volatile memory and more than one of each type of memory, with such memories being collectively represented by the memory 103. The instructions to cause the game controller 101 to implement the present invention will be stored in the memory 103. The instructions and data for controlling operation of the computational device 102 may be stored on a computer readable medium from which they are loaded into the gaming machine memory 103. The instructions and data may be conveyed to the gaming machine by means of a data signal in a transmission channel. Examples of such transmission channels include network connections, the Internet or an intranet and wireless communication channels.

The game controller 101 may include hardware credit meters 104 for the purposes of regulatory compliance and also include an input/output (I/O) interface 105 for communicating with the peripheral devices of the gaming machine 100. The input/output interface 105 and/or the peripheral devices may be intelligent devices with their own memory for instructions and data.

In the example shown in FIG. 2, the peripheral devices that communicate with the controller are the displays 106, bank of buttons/touch screen 107, the card and/or ticket reader 108, the printer 109, a bill acceptor and/or coin input 110 and a coin output 111. Additional devices may be included as part of the gaming machine 100, or devices omitted as required for the specific implementation.

The bank of buttons 107A and/or touch screen 107B together with one or both of the displays 106 may provide a user interface 115 through which the gaming machine 100 and player communicate. If a card/ticket reader 108 is provided, this may also form part of the user interface 115.

In addition, the gaming machine 100 may include a communications interface, for example a network card 112. The network card 112, may for example, send status information, accounting information or other information to a central controller, server or database and receive data or commands from the central controller, server or database. The network card 112 may also enable communication with a central player account, allowing cashless gaming. One or more of the peripheral devices, for example the card/ticket reader 108 may be able to communicate directly with the network card 112. The network card 112 and the I/O interface 105 may be suitably implemented as a single machine communications interface.

The game controller 101 may also include a random number generator 113, which generates a series of random numbers that are used by the computational device 102 to determine the outcomes of games played on the gaming machine 100.

The game controller 101 may have distributed hardware and software components that communicate with each other directly or through a network or other communication channel. The game controller 101 may also be located in part or in its entirety remote from the user interface 115. Also, the computational device 102 may include a plurality of devices, which may be local or remote from each other. Instructions and data for controlling the operation of the user interface 115 may be conveyed to the user interface 115 by means of a data signal in a transmission channel. The user interface 115 may be a computational device, for example a personal computer, used by a person to play a game provided from a remote game controller 101.

Figure 3:
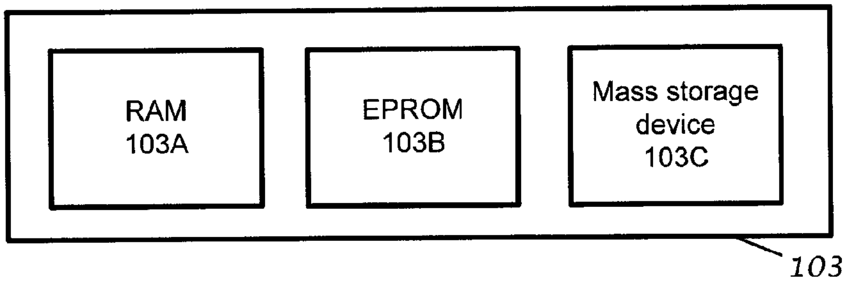
FIG. 3: shows a block diagram of components of the memory of the gaming system represented in FIG. 2.

FIG. 3 shows an exemplary block diagram of the main components of the memory 103. The RAM 103A typically temporarily holds instructions and data related to the execution of game programs and communication functions performed by the computational controller 102. The EPROM 103B may be a boot ROM device and/or may contain system and game related code. The mass storage device 103C may be used to store game programs, the integrity of which may be verified and/or authenticated by the computational controller 102 using protected code from the EPROM 103B or elsewhere.

Figure 4:
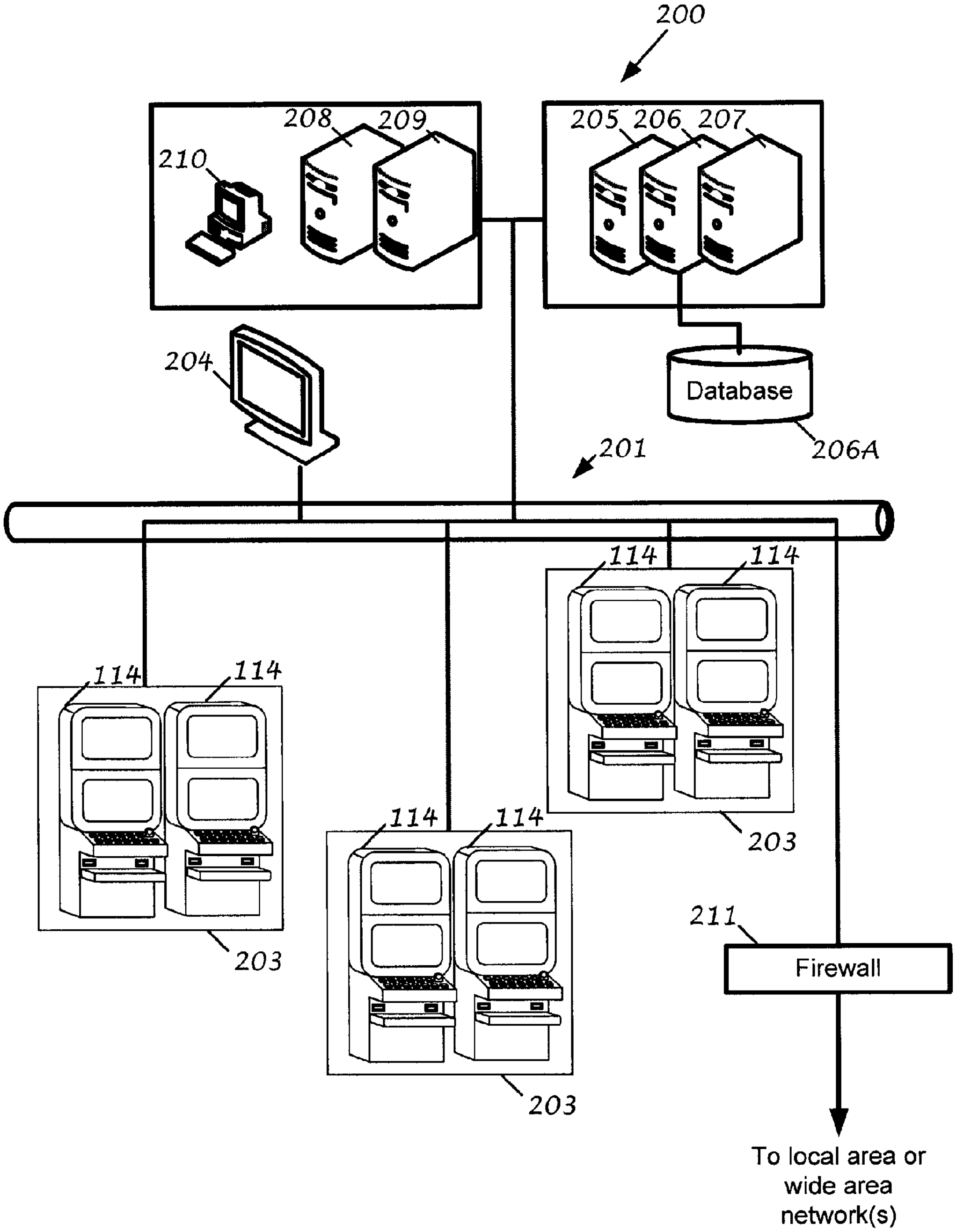
FIG. 4: shows diagrammatically, a network gaming system suitable for implementing the present invention.

FIG. 4 shows a gaming system 200 in the form of a network of devices. The gaming system 200 includes a network infrastructure 201, which for example may be in the form of an Ethernet network. Alternatively, a wireless network and/or direct communication channels, or a different type of network may be used to link the gaming machines to a server, each other and/or other devices. Gaming consoles 114, shown arranged in three banks 203 of two gaming consoles 114 in FIG. 4, are connected to the network infrastructure 201. The gaming consoles 114 may form part or all of a gaming machine 100. Single gaming consoles 114 and banks 203 containing three or more gaming devices 202 may also be connected to the network infrastructure 201, which may also include bank controllers, hubs, routers, bridges to other networks and other devices (not shown).

One or more displays 204 may also be connected to the network 201. The displays 204 may, for example, be associated with a bank 203 of gaming consoles 114. The displays 204 may be used to display representations associated with game play on the gaming devices 202, and/or used to display other representations, for example promotional or informational material.

Servers may also be connected to the network 201. For example, a game server 205 may generate game outcomes for games played on one or more of the gaming consoles 114, a database management server 206 may manage the storage of game programs and associated data in a database 206A so that they are available for downloading to, or access by, game controllers 101, and a jackpot server 207 may control one or more jackpots for the gaming system 200.

Further servers may be provided to assist in the administration of the gaming system 200, including for example a gaming floor management server 208, and a licensing server 209 to monitor the use of licenses to particular games. An administrator terminal 210 is provided to allow an administrator to manage the network 201 and the devices connected to the network. The different servers depicted can be distinct physical servers or logically distinct server processes running on a single physical server.

The gaming system 200 may communicate with other gaming systems, other local networks, for example a corporate network and/or a wide area network such as the Internet through a firewall 211.

Embodiments of the present invention may be performed by the gaming system 200, in which the gaming consoles 114 each include game controllers 101 to form gaming machines 100 and the following description assumes this implementation. However, those skilled in the relevant arts will appreciate that the invention will also be able to be implemented in other gaming systems.

The present invention relates to a method of awarding jackpot prizes on a gaming machine. As discussed previously herein, one problem with awarding jackpot prizes occurs when it is possible to wager a variable amount, but the probability of winning the jackpot prize awarded does not reflect the size of the wager.

One method that has been utilised in the past to address this problem is to make the probability of winning the jackpot dependent on the size of the wager made by the player. An example is described in Australian patent application number 754689, which describes providing a feature game on the occurrence of a trigger condition, with the occurrence of the trigger condition being dependent on the turnover on a gaming console. Jackpot awards can be won from the feature game.

The invention will be described with reference to various embodiments, but is not limited to only the distinct embodiments described. The invention also extends to all useful combinations of the embodiments and to such modifications and additions that may be made to the embodiments as will be apparent to a person skilled in the relevant arts.

Figure 5:
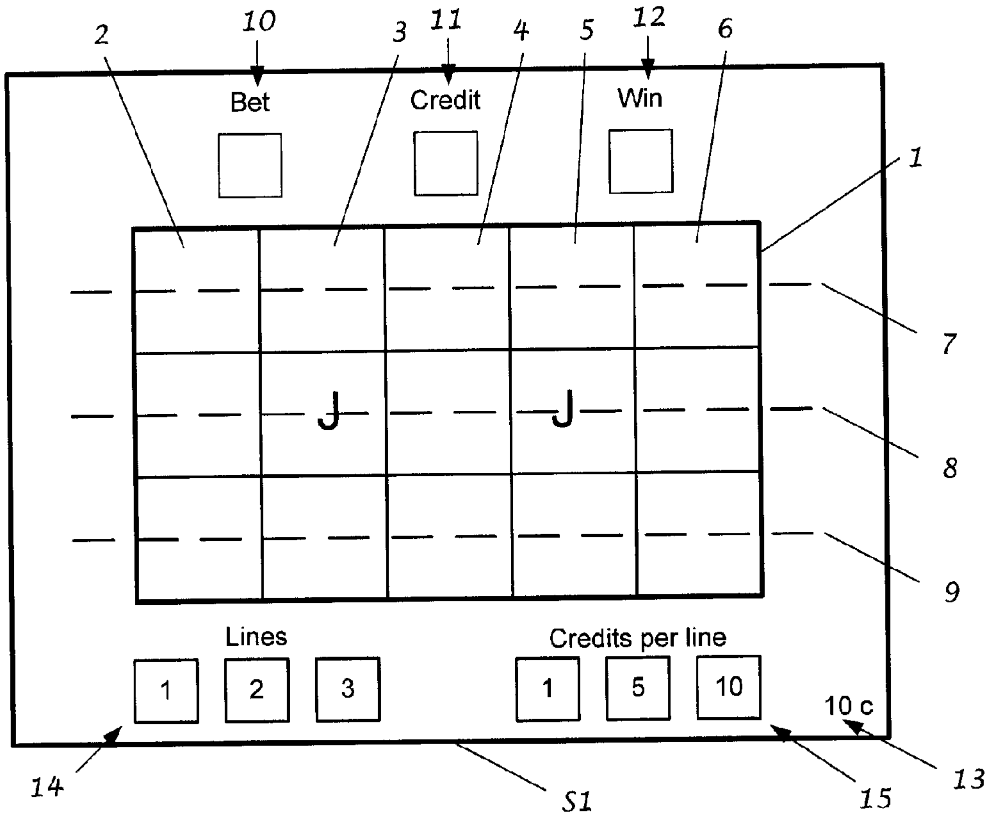
FIG. 5: shows diagrammatically, an example of a screen shot of a game in accordance with an embodiment of the present invention.

FIG. 5 shows diagrammatically a screen shot S1 of a game that may incorporate various embodiments of the present invention. The game includes a game window 1 in which selected symbols are displayed to form combinations of symbols. In this example, within the game window 1 are five representations of spinning reels 2-6, each of which presents three symbols in the game window 1 when stopped. Across the five spinning reels 2-6 are three horizontal pay lines 7-9. The combinations resulting from a game play are therefore the three combinations of: the uppermost symbols within the display window 1 of the five reels; the middle symbols within the display window 1 of the five reels; and the lowest symbols within the display window 1 of the five reels. Each of the reels

2-6 will have a length longer than the three display windows, allowing the stopping position of the reels to be randomly determined according to numbers from the RNG 113 to form random combinations along the pay lines 7-9.

The total wager staked on a game is displayed in a bet meter display 10, the total amount of credit held in the credit meters 104 of the gaming machine 100 are displayed in the credit meter display 11 and the amount won, if any, from a game play of the game is displayed in a win meter display 12. The denomination of the game, in this example 10 cents, is displayed at 13. The total wager staked on a game is in this example controllable by a player by operating the line selection touch pads 14 and the credits per line selection touch pads 15. These may operate in addition to corresponding buttons provided in the button panel 107A, if provided. A player can operate the gaming machine 100 providing the game to wager between 1 to 10 credits (10 cents to 1 dollar) across 1, 2 or 3 win lines. The total range of wagers possible is therefore 1 credit to 30 credits.

An example of a jackpot winning combination is shown in FIG. 5 as the occurrence of two jackpot symbols T occurring along the play line 8. Other symbols would be displayed in the various symbol positions in the display window 1 with the two "J" symbols, and these may or may not award an award separate from the jackpot (or chance to win the jackpot).

In the following description of various embodiments, the variable C is used to indicate the aspect of a wager that would be, apart from the reel length and/or number of jackpot symbols variation, independent of the probability of winning the jackpot. For example, in the game shown in FIG. 5, if the jackpot is won when three jackpot symbols are displayed along a pay line, C is the number of credits bet per line. If the jackpot is won when three jackpot symbols are displayed anywhere in the display window 1, then C is the product of the number of lines selected and the number of credits bet per line.

Embodiment 1

In one embodiment of the present invention, a jackpot may be awarded directly from a wagering game played on a gaming machine, rather than from a feature game. This embodiment is described with reference to a spinning reel game of the form where the player can select the number of pay lines on which to wager and can stake a variable amount on the selected number of pay lines. The jackpot is won when a combination of jackpot winning symbols occurs along any pay line on which the player has staked a wager.

In this embodiment the reel strips of the game are variable so that the chance of occurrence of a certain winning symbol combination is proportional to the number of credits wagered per pay line (C). This is appropriate for the winning symbol combination(s) that indicate the award of the jackpot prize(s), where the size of the prize is not proportional to the wager.

Also, in this embodiment the number of reels carrying one or more jackpot symbols equals the number of jackpot symbols that are displayed when a jackpot winning combination occurs. As will be apparent from the following description, adopting this arrangement may simplify the game design process.

The length of at least one of the reel strips 2-6 carrying one or more jackpot symbols is varied dependent on the wager. The number of jackpot symbols across the reel strips remains constant in such a way that the product of the size of the reel strips that contain the jackpot winning symbols is inversely proportional to the units wagered C.

By way of example of this embodiment, assume a game in which two jackpot symbols are required along a pay line 7-9 to win the jackpot and two of the reel strips 2-6 each carry a single jackpot symbol. When the wager is 1 (C=1), those two reel strips are both 10 stops long. The product of reel strip length is 10×10=100. The product of the number of jackpot symbols is 1×1=1 and the chance of 2 jackpot symbols occurring along a pay line is 1/100.

When the wager is 2 (C=2), the two reel strips that carry the jackpot symbols are 5 and 10 stops long respectively. The product of the number of jackpot symbols remains the same at 1 (P=1). The product of the reel strip length is halved to 5×10=50 and the chance of 2 jackpot symbols occurring along a pay line is 1/50.

As shown by this example, in which there is an equal number of reels carrying jackpot symbols as the number of jackpot symbols required to form a jackpot winning combination, the product of the reel strips is inversely proportional to C and the chance of the jackpot combination occurring is proportional to C.

Different versions of this general embodiment may be implemented, including the following.

There may be a plurality of jackpots and each jackpot may have its own jackpot symbols, so that there are a corresponding plurality of jackpot symbols. In this case the number of each type of jackpot symbol provided on the reels may be proportional to the size of the jackpot, or expected average size of the jackpot when awarded.

In another version, there may be a plurality of jackpots and a single jackpot symbol and jackpot winning combination (e.g. two jackpot symbols occurring on a pay line 7-9). When the jackpot winning combination occurs a random selection process follows in which the jackpot that is to be awarded is selected. Following this, the player is notified of the result of this selection and paid the selected jackpot. The selection process may be weighted according to the relative sizes or expected sizes of the jackpots.

In another version, the jackpot awarding trigger condition may be varied. For example, the trigger condition may the occurrence of two jackpot symbols anywhere on a display, or alternatively the occurrence of one or three (or more) jackpot symbols on a pay line or anywhere on the display.

Combinations of the variations may form further variations. For example, one jackpot symbol may be associated with a plurality of jackpots which are randomly selected when the jackpot winning combination occurs. Another jackpot symbol in the same game may be associated with a single jackpot. The game may or may not have a feature game, which may have a different trigger condition to the jackpot winning combination. Alternatively, the jackpot winning combination may award both a jackpot and a feature game. In another alternative, the jackpot may be won from a feature game, which has a fixed probability of awarding the jackpot (i.e. the probability of winning once the feature game has been entered is independent of C).

Embodiment 2

This embodiment is the same as embodiment 1, except that the jackpot symbols are scatter pays symbols. This means that the jackpot is awarded when the required number of jackpot symbols are displayed, regardless of whether the jackpot symbols are displayed along any pay line. In this embodiment, the reel length is adjusted based on the total wager placed by the player, instead of only the wager staked per pay line. In other words, the variable units wagered C is the total wager.

Taking the example where two jackpot symbols are required to trigger the jackpot and only two reels carry jackpot symbols. When the wager is 1 (C=1), which may be a wager of one credit on one pay line 7-9, those two reel strips are both 10 stops long. The product of reel strip length is 10×10=100. The product of the number of jackpot symbols is 1×1=1, the product of the number of locations that the jackpot symbol may occur in (i.e. the number of symbols displayed by each reel in the display window 1) is 9, and the chance of 2 jackpot symbols occurring is 9/100.

When the wager is 4 (C=4), which may be a wager of 2 credits on two pay lines, the two reel strips that carry the jackpot symbols are both 5 stops long. The product of the number of jackpot symbols remains the same at 1. The product of the reel strip length is quartered to 5×5=25 and the chance of 2 jackpot symbols occurring along a pay line is 9/25.

Embodiment 3

Alternative embodiments involve changing both the product of the number of jackpot symbols and the product of the length of the reel strips, such that the chance of winning the jackpot is still proportional to the units wagered.

In one example, when wager is 1 (C=1), the game may have 2 reel strips each carrying a single jackpot symbol, which are both 10 stops long. The product of reel strip lengths is 100 and the product of the number of jackpot symbols is 1 (P=1). Accordingly, for a game in which the jackpot symbols must occur along a pay line on which the player has wagered, the chance of 2 jackpot symbols occurring is 1/100

When wager is 2 (C=2), the game may change to 2 reel strips which carry jackpot symbols, which are 10 and 15 stops long respectively. The number of jackpot symbols on reel 1 may stay at 1 and the number of jackpot symbols on reel 2 may be increased to 3. Hence the product of the number of jackpot symbols is 3 (P=3) and the product of reel strip length is 150, giving a chance of 2 jackpot symbols occurring of 3/150.

In this example, the length of a reel has increased, despite the requirement for a higher probability for the occurrence of a jackpot symbol. This is due to the increased reel length having been compensated for by the triple increase in the number of jackpot symbols. Thus, it will be appreciated that using both variations in the reel length and number of jackpot symbols may provided increased flexibility in game design.

Embodiment 4

Further alternative embodiments incorporate a feature game, which is triggered on occurrence of a trigger condition. The feature game may be provided by the game controller which is local to the console, or may be provided by a game controller remote from the console 114, for example by the remote controller taking control of one or both of the displays 106A, 106B of the console 114.

In these alternative embodiments, the probability of entering the feature game may either be independent of the size of the wager placed by the player, or may depend on the size of the wager.

For example, the base game may be a spinning reel game in which the player can wager a variable amount of credits per line and can also select the number of lines on which the player wishes to wager on. The trigger condition for the feature may be displayed as the occurrence of three special symbols along any pay line on which the player has made a wager. Therefore, a player placing 2 credits per line on 1 line has the same chance of entering the feature as a player placing 2 credits per line on 10 lines, when measured on a per credit bet basis.

However, with all other things remaining constant, as is typical, a player placing 10 credits per line has a reduced chance of entering the feature than a player betting 2 credits per line on the same number of lines. Accordingly, in an embodiment of the present invention, this difference is addressed in the feature game.

The feature game may be a spinning reel game with three spinning reels, all of which carry one jackpot symbol. The jackpot is awarded when two or more jackpot symbols occur along a pay line on which the player wagered in the base game.

For example, if the player wagered 2 credits per line, the reels may each be 10 stops long. The chance of obtaining two or more jackpot symbols is approximately 2.8%. If the player wagered 10 credits per line, two reels may be four stops and one five stops long, giving a chance of 13.75%, which is within 2 percent of 14%, being five times the chance when 2 credits per line were wagered.

In general, for a three reel game, the chance of achieving two or more jackpot symbols along a pay line is:

Where P is the chance of achieving two or more jackpot symbols along a pay line, J1 is the number of jackpot symbols on reel 1, J2 is the number of jackpot symbols on reel 2, J3 is the number of jackpot symbols on reel 3, R1 is the number of symbols/stops on reel 1, R2 is the number of symbols/stops on reel 2 and R3 is the number of symbols/stops on reel 3. All variables apart from P are constrained to integers, which will mean that for many values of P, there will not be a solution to this equation within this constraint.

Various techniques are known for finding an approximate solution (i.e. where integer values for the J and R variables provide a P that is acceptably close the required P). A trial and error approach may be used. This may assume as a starting point that all reels have one jackpot symbol and the same number of reel stops to identify an approximate number of reels in each reel, then the number of jackpot symbols and/or reel stops on individual reels may be varied using trial and error until an acceptable probability is achieved.

Those skilled in the relevant arts will appreciate that for other games with other trigger conditions, the equation governing the chance of the jackpot being won will be different. In addition, the above mentioned type of game in which more reels carry jackpot symbols than the number of jackpot symbols required to win the jackpot may be applied to a base game.

Embodiment 5

In another embodiment, the jackpot may be won from a feature game and the chance of entering the feature game may partially, but not fully reflect the change in wager. For example, for C=1 there may be a 2% chance of triggering the feature game and for C=10 there may be a 10% chance of entering the feature game. When in the feature game, the chance of winning the jackpot may be 10% for C=1 and 20% for C=10. Therefore the overall chance of winning the jackpot for C=1 is 0.2% and for C=10 the chance is 2%.

Using both the feature game and the base game to change the overall probability of winning the jackpot dependent on the wager placed provides additional flexibility. For example, as before, for C=1 there may be a 2% chance of triggering the feature game and the chance of winning in the feature game may be 10%. For C=10 there may instead be a 60% chance of entering the feature game and a 3.33% chance of winning the jackpot in the feature game. In another alternative, for C=10 there may be a 4% chance of triggering the feature game and a 50% chance of winning the jackpot from the feature game.

The variation in one or both the base game and feature game may be achieved by varying the number of reel stop positions and/or the number of jackpot symbols on the reels. Alternatively, other methods may be used for the base game, the feature game or both, for example using the previously referred to Hyperlink™ system of Aristocrat.

The invention could also be applied to a game where the probability of achieving a trigger condition, which results or may result in the award of a jackpot, remains the same when viewed on a per cent bet, as the player wagers different amounts per pay line. However, the probability of the trigger condition may vary on a per cent bet basis, as the player wagers on more or less combinations. In this (unusual) case, the length of the reel strips and/or the number of jackpot symbols in the base game and/or in the feature game (if provided) may vary dependent on the number of combinations on which the player has wagered but is independent of the amount wagered on each combination.

Changing the Reel Strips

The game will likely have components other than the jackpot prize. Typically gaming machines offer a range of prizes for various winning combinations of symbols and these prizes are specified in a pay table.

To maintain a constant probability of occurrence of each winning combination, the reel stop positions need to be selected to maintain the probability between winning and losing combinations and maintain the relative probability of the winning combinations. One way to achieve this is to remove from the reels that carry jackpot symbols all other symbols in proportion to the change in reel length. For example, for a reel that reduces in size by half, the number of all symbols except the jackpot symbols is halved.

Where a wide range of wagers can be placed, the length of the reel strips carrying the jackpot symbols may be enlarged, so as to accommodate the required reduction in reel length as the wager increases. The extent of enlargement, if any, which may be required is reduced the more reel strips that carry jackpot symbols and which have their length adjusted dependent on the wager. It may also be reduced by varying the number of jackpot symbols in concert with a variation of the reel length.

For example, assume that the minimum reel length is 5 stops and that there are two different winning symbols, an ACE and a KING. In the minimum reel length there is also a JACKPOT symbol, and non-winning symbols TEN and NINE. In embodiments 1 and 2 mentioned above, a reel strip length of ten is achieved by having two ACE symbols, two KING symbols, one JACKPOT symbol and five symbols allocated between TEN and NINE, for example three TEN symbols and two NINE symbols.

If the jackpot trigger condition is three jackpot symbols and only three reels carry jackpot symbols, then a halving of the length of each reel strip results in a decrease in the product of the reel lengths by a factor of six, accommodating a variation in the size of wagers by a factor of six. Therefore a variation from ten to five reel stops as described in embodiments 1 and 2 could accommodate for example, C=1 to C=6.

Referring again to the examples in embodiments 1 and 2 where two reel strips carry jackpot symbols, if the longest length of the reel strips carrying the jackpot symbols were duplicated three times, then the largest reel length would be 28 stops (three sets of the nine symbols that are not jackpot symbols plus the one jackpot symbol). If this enlarged reel was used for both jackpot symbol carrying reels, then:

When the reel length of both reels is 28 stops, which may be used when C=1, the product of the reel strip length is 784 and the product of the number of jackpot symbols is 1. The chance of 2 jackpot symbols occurring along a pay line is 1/784;

If the reel length of one reel is 10 stops and the other reel is 26 stops, then the probability is 1/260, which is approximately three times of the probability when both reel strips have 28 stops. This may be used when C=3. Alternatively C=3 may result in one reel 13 stops and the other 20 stops also giving a probability of 1/260;

For C=5, one reel may be 12 stops and the other 13, giving a probability of 1/156, which is approximately five times the probability when both reel strips have 28 stops;

For C=20, one reel may be 8 stops and the other 5 stops, giving a probability of 1/40, which is approximately twenty times the probability when both reel strips have 28 stops; and If both reels are five stops long, then the probability is 1/25, which is within 5% of thirty times the probability when both reel strips have 28 stops and may therefore be acceptable for C=30.

Other reel strip lengths may be determined for other values of C. Similar calculations can be performed with other trigger conditions, such as a scatter pays jackpot symbol.

While the embodiments described herein are given with reference to a spinning reel game, the invention may also be applied to other types of games. For example, in a card-based game, the size of the deck from which the cards are dealt may be varied, either alone or in combination with the number of jackpot cards in the deck. There may be a plurality of separate decks of cards or a single deck of cards. For example, a plurality of 'hands' may be dealt, with each hand dealt from a separate deck or alternatively, all hands may be dealt from the same deck (which need not be a standard 52 card deck of cards). Dealing may be with or without replacement, which will influence the probability of occurrence of the jackpot symbols.

While the foregoing description has been provided by way of example of the preferred embodiments of the present invention as presently contemplated, which utilise gaming machines of the type found in casinos, those skilled in the relevant arts will appreciate that the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention. In particular, but without limitation, different aspects of the various embodiments and variations described herein may be combined to form further embodiments of the invention.

The invention claimed is:

1. A gaming system for playing a game in which a plurality of symbol images are selected from one or more symbol sets of symbol images to form one or more combinations of symbol images and if the combinations of symbol images include a winning combination of symbol images, the gaming system awards an award, the gaming system awarding a jackpot dependent on an occurrence of a jackpot winning event that includes an occurrence of one or more jackpot symbol images, the gaming system including:

a non-transitory memory configured to store a plurality of symbol sets, each of said symbols sets having a plurality of images of a plurality of symbols, and at least one of said symbol sets having at least one jackpot symbol image;

a user interface including a) a display configured to display images of said symbols from at least one of said symbol sets, and b) a wager selector configured to receive a selection of a wager;

a game controller configured a) to receive a player selection of a wager at said wager selector, b) to vary, if all other variables of the game remain constant, at least one aspect of the wager disproportionately to the probability of the jackpot being awarded, and c) to vary the number of said images of at least one of the symbol sets from which the at least one jackpot symbol image is selected between game plays, dependent on said at least one aspect of the wager, so as to maintain at least a constant probability of the jackpot being won despite variations in said at least one aspect of the wager.

2. A gaming system for playing a game in which a plurality of symbol images are selected from a plurality of symbol sets of symbol images to form one or more combinations of symbol images and if one or more of said combinations of symbol images on which the player has staked a wager include a winning combination of symbol images, the gaming system awards an award, the gaming system awarding a jackpot dependent on an occurrence of a jackpot winning event that includes an occurrence of one or more jackpot symbol images, the gaming system including:

a non-transitory memory configured to store a plurality of symbol sets, each of said symbols sets having a plurality of images of a plurality of symbols, and at least one of said symbol sets having at least one jackpot symbol image;

a user interface including a) a display configured to display images of said symbols from at least one of said symbol sets, and b) a wager selector configured to receive a selection of a wager;

a game controller configured a) to receive a player selection of at least one of a first wager aspect and a second wager aspect at said wager selector, the first wager aspect being the number of said combinations of symbol images on which to stake a wager and the second wager aspect being the amount to stake on the selected combinations of symbol images, and b) to vary the number of said images of at least one of the symbol sets from which the at least one jackpot symbol image is selected between game plays, dependent on at least one of the first and second wager aspects, so as to maintain at least a constant chance of the jackpot being won despite variations in the first and/or second wager aspects.

3. The gaming system of claim 1, wherein the game is a spinning reel game so that the plurality of symbol sets of symbol images are each in the form of a variable-length reel in the spinning reel game and at least one of the reels includes at least one jackpot symbol image.

4. The gaming system of claim 3, wherein the one or more combinations of symbol images include symbol images along one or more pay lines defined across the spinning reels.

5. The gaming system of claim 4, wherein a said jackpot winning event is the occurrence of a certain number of jackpot symbol images along a pay line on which the player has staked a wager.

6. The gaming system of claim 5, wherein the number of symbol images in at least one of the symbol sets of symbol images from which the jackpot symbols are selected is variable dependent on the amount staked by the player per pay line in that game play and not dependent on the number of pay lines on which a wager has been staked.

7. The gaming system of claim 1, wherein the number of symbol images in at least one of the symbol sets of symbol images from which the jackpot symbols are selected is variable dependent on the product of the amount staked by the player per pay line in that game play and the number of pay lines on which a wager has been staked.

8. The gaming system of claim 1, wherein the game includes a base game and a feature game which is played when a trigger condition occurs during play of the base game, and wherein the jackpot is won from the feature game.

9. The gaming system of claim 8, wherein the jackpot symbol images occur in the feature game and the number of symbol images in at least one of the symbol sets of symbol images from which the jackpot symbols are selected is variable between game plays of the feature game, dependent on the first and/or second wager aspects of the wager made in the base game in which the trigger condition occurred.

10. The gaming system of claim 9, wherein the probability of occurrence of the trigger condition is independent of both the first and second wager aspects of the wager made in the base game.

11. The gaming system of claim 9, wherein the probability of occurrence of the trigger condition is dependent on the first wager aspect and independent of the second aspect, and wherein the number of symbol images in at least one of the symbol sets f symbol images from which the jackpot symbols are selected is variable between game plays of the feature game, dependent on the second wager aspect of the wager made in the base game in which the trigger condition occurred and independent of the first wager aspect of the wager made in the base game.

12. The gaming system of claim 9, wherein the probability of occurrence of the trigger condition is dependent on the second wager aspect and independent of the first aspect, and wherein the number of symbol images in at least one of the symbol sets of symbol images from which the jackpot symbol images are selected is variable between game plays of the feature game, dependent on the first wager aspect of the wager made in the base game in which the trigger condition occurred and independent of the second wager aspect of the wager made in the base game.

13. The gaming system of claim 1, wherein the number of jackpot symbol images in at least two sets of symbol images is variable between game plays, dependent on at least one of the first and second wager aspects.

14. A method for use with a gaming system that provides a game in which a plurality of symbol images are selected to form one or more combinations of symbol images and if one or more of said combinations of symbol images on which the player has staked a wager include a winning combination, the gaming system awards an award, the gaming system includes a non-transitory memory configured to store a plurality of symbol sets, each of said symbols sets having a plurality of images of a plurality of symbols, and at least one of said symbol sets having at least one jackpot symbol image, a user interface including a) a display configured to display images of said symbols from at least one of said symbol sets, and b) a wager selector configured to receive a selection of a wager, and a game controller, the method including:

- displaying on said display via the game controller a plurality of said symbol images;
- awarding via the game controller a jackpot dependent on an occurrence of a jackpot winning combination on said display that includes one or more jackpot symbol images during play of the game;
- receiving at said wager selector a selection of at least one of a first wager aspect and a second wager aspect, the first wager aspect being the number of said combinations of symbol images on which to stake a wager and the second wager aspect being the amount to stake on the selected combinations of symbol images; and
- dependent on the received selection at said wager selector, varying via the game controller the number of symbol images in at least one of the symbol sets from which the jackpot symbol images are selected, including maintaining via the game controller at least a constant chance of the jackpot being won despite variations in the first and/or second wager aspects.

15. The method of claim 14, wherein the game includes a base game playable on the game system, the method further including triggering via the game controller a feature game from the base game, and awarding via the game controller the jackpot dependent on the occurrence of a said jackpot winning combination on said display in the feature game.

16. A gaming system for playing a game in which a plurality of symbol images are selected from one or more symbol sets of symbol images to form one or more combinations of symbol images and if the combinations of symbol images include a winning combination of symbol images, the gaming system awards an award, the gaming system awarding a jackpot dependent on an occurrence of a jackpot winning event that includes a first event in a base game of the game and a second event in a feature game of the game, both the first and the second events occurring with a probability in their respective base and feature games between zero and one, the gaming system including:

- a non-transitory memory configured to store a plurality of symbol sets, each of said symbols sets having a plurality of images of a plurality of symbols, and at least one of said symbol sets having at least one jackpot symbol image;
- a user interface including a) a display configured to display images of said symbols from at least one of said symbol sets, and b) a wager selector configured to receive a selection of a wager;
- a game controller configured a) to receive a player selection of a wager at said wager selector, b) to vary, if all other variables of the game remain constant, at least one aspect of the wager disproportionately to the probability of the jackpot being awarded, and c) to vary the probability of both the first event and the second event, dependent on said aspect of the wager, so as to maintain at least a constant probability of the jackpot being won despite variations in said at least one aspect of the wager.

17. The gaming system of claim 16, wherein at least one of the first and second events includes the selection of jackpot symbol images from one or more symbol sets of symbol images, wherein the game controller is further configured to vary the number of symbol images in the one or more symbol sets from which a jackpot symbol image may be selected to achieve said variation in the probability of the first event and/or the second event.

18. The gaming system of claim 17, wherein the game controller is further configured to vary the number of jackpot symbol images to achieve, in combination with the variation in the number of symbol images in the symbol set of symbol images, said variation in the probability of the first event and/or the second event.

19. A method for use with a gaming system for playing a game in which a plurality of symbol images are selected to form one or more combinations of symbol images, the gaming system includes a non-transitory memory configured to store a plurality of symbol sets, each of said symbols sets having a plurality of images of a plurality of symbols, and at least one of said symbol sets having at least one jackpot symbol image, a user interface including a) a display configured to display images of said symbols from at least one of said symbol sets, and b) a wager selector configured to receive a selection of a wager, and a game controller, the method including:

providing a base game including displaying on said display via the game controller a plurality of said symbol images;

providing a feature game including displaying on said display via the game controller a second plurality of said symbol images on an occurrence of a first event with respect to displayed images of said symbols on said display during play of the base game;

awarding via the game controller a jackpot on an occurrence of a second event with respect to displayed images of said symbols on said display during play of the feature game; and varying via the game controller the probability of both the first and the second events dependent on at least an aspect of a wager placed to play the base game, including maintaining via the game controller said variation at least a constant probability of the jackpot being won despite variations in said aspect of the wager.

20. The method of claim 19, further including indicating an occurrence of at least one of the first and second events on the display having at least one of a) a jackpot symbol image and b) a combination of jackpot symbol images, and achieving the probability of at least one of the first and second events including varying the number of symbol images in a symbol set of symbol images from which a jackpot symbol or jackpot symbols are selected for display.

* * * * *